July 21, 1936.  J. S. STOKES ET AL  2,048,301
SYSTEM FOR MAKING BOX BLANKS
Filed Feb. 4, 1933  9 Sheets-Sheet 1
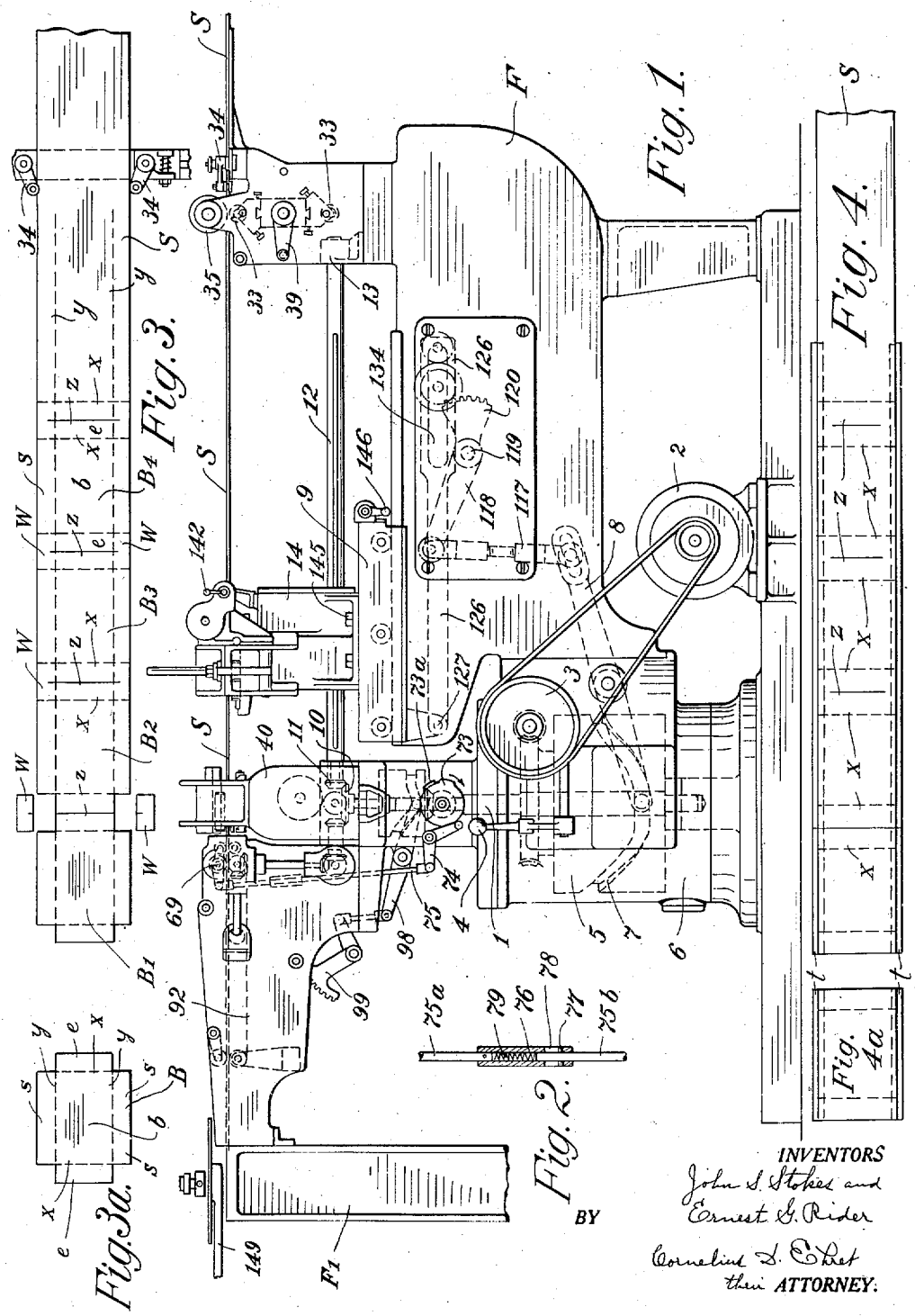
INVENTORS
John S. Stokes and
Ernest G. Rider
BY Cornelius D. Ehret
their ATTORNEY.

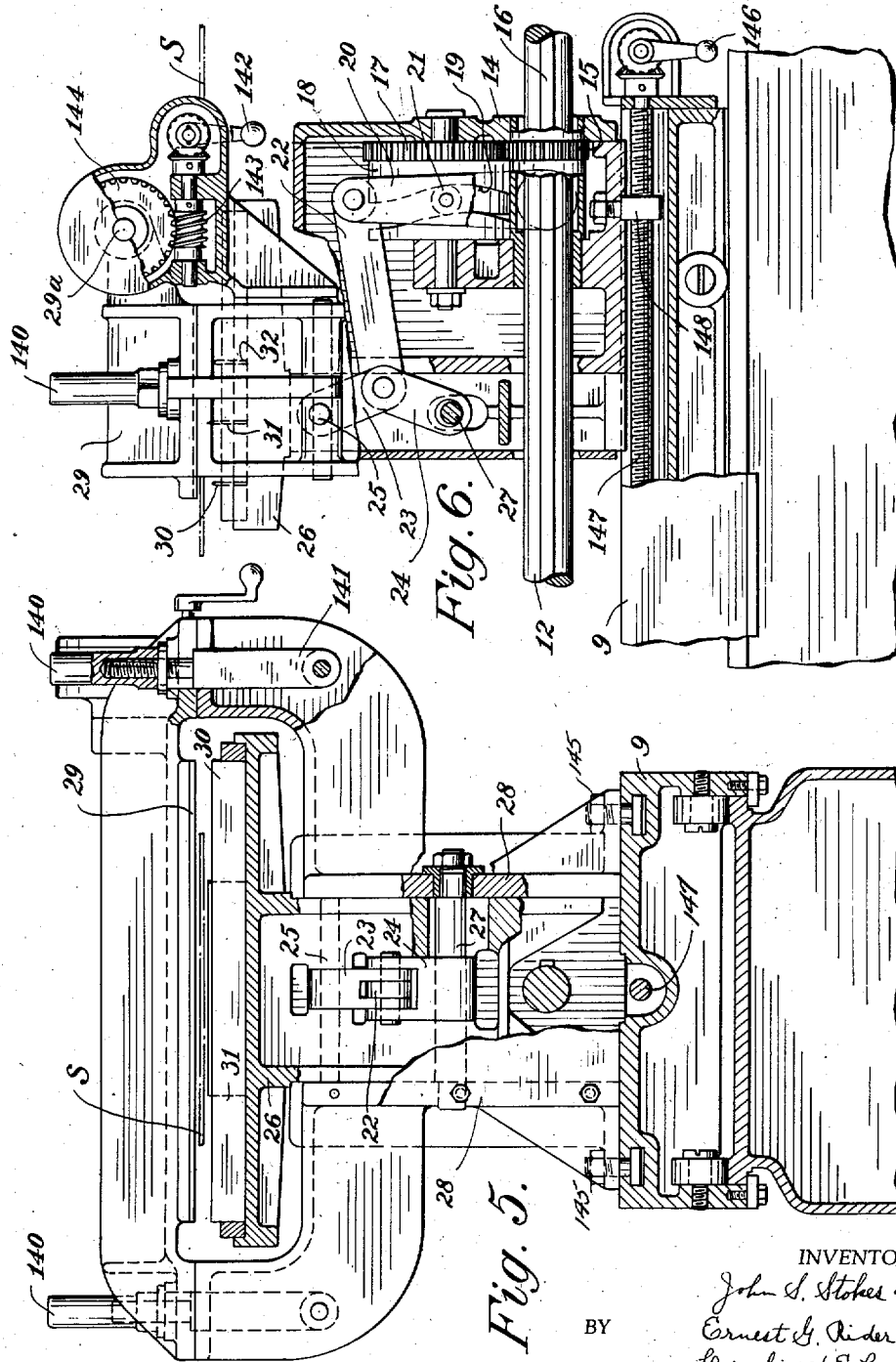

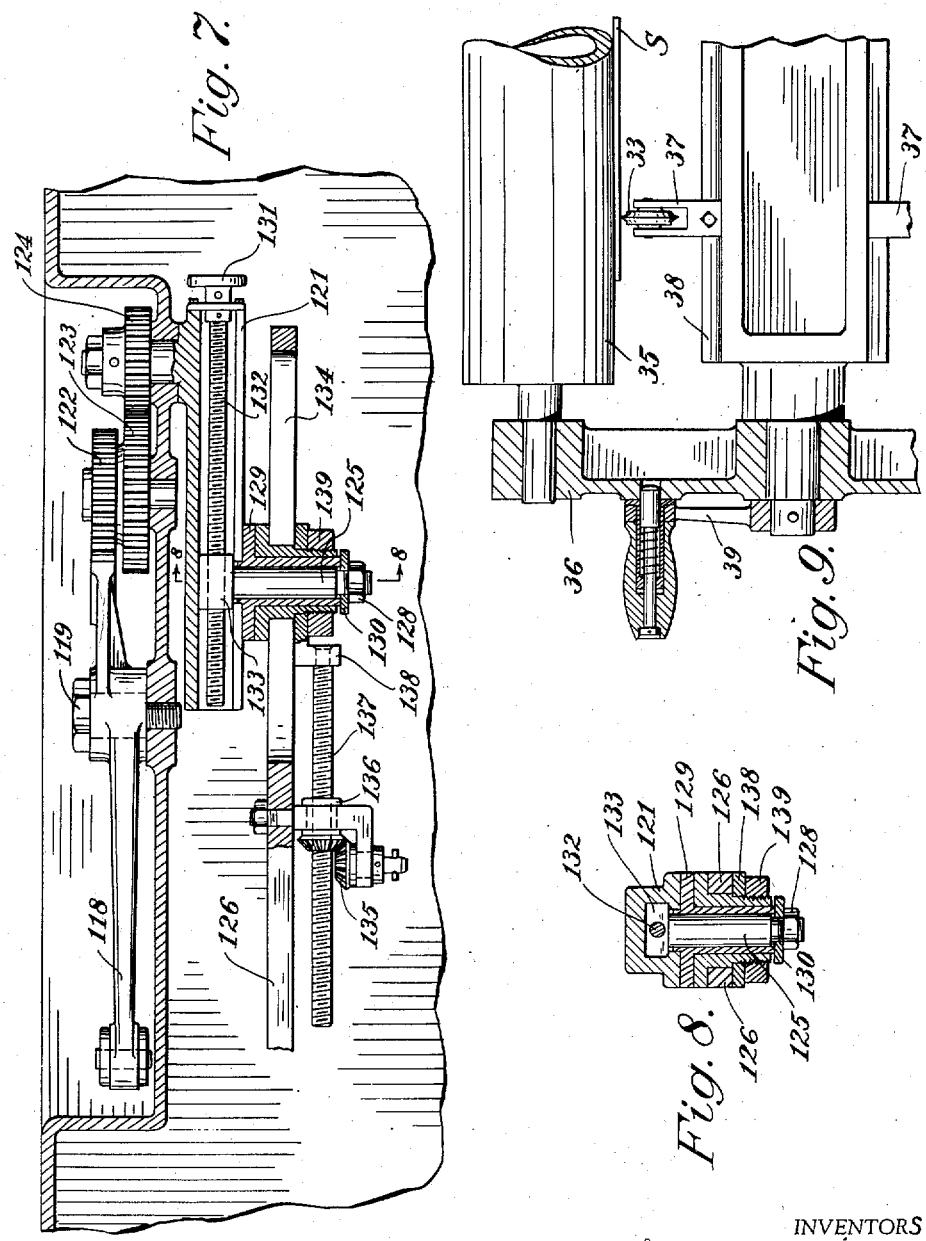

July 21, 1936.  J. S. STOKES ET AL  2,048,301
SYSTEM FOR MAKING BOX BLANKS
Filed Feb. 4, 1933  9 Sheets-Sheet 4
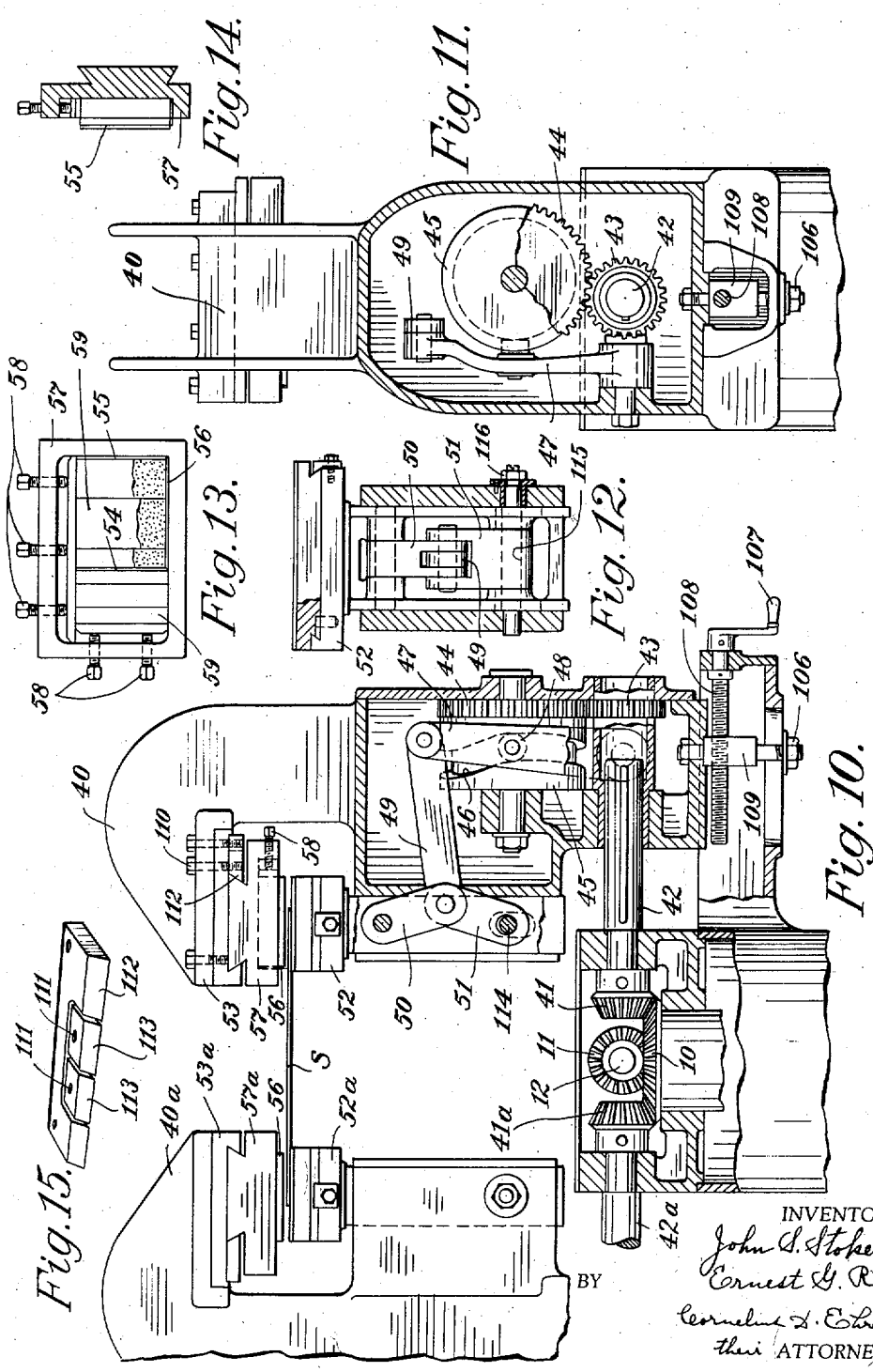
INVENTORS
John S. Stokes and
Ernest G. Rider
BY Cornelius D. Ehret
their ATTORNEY.

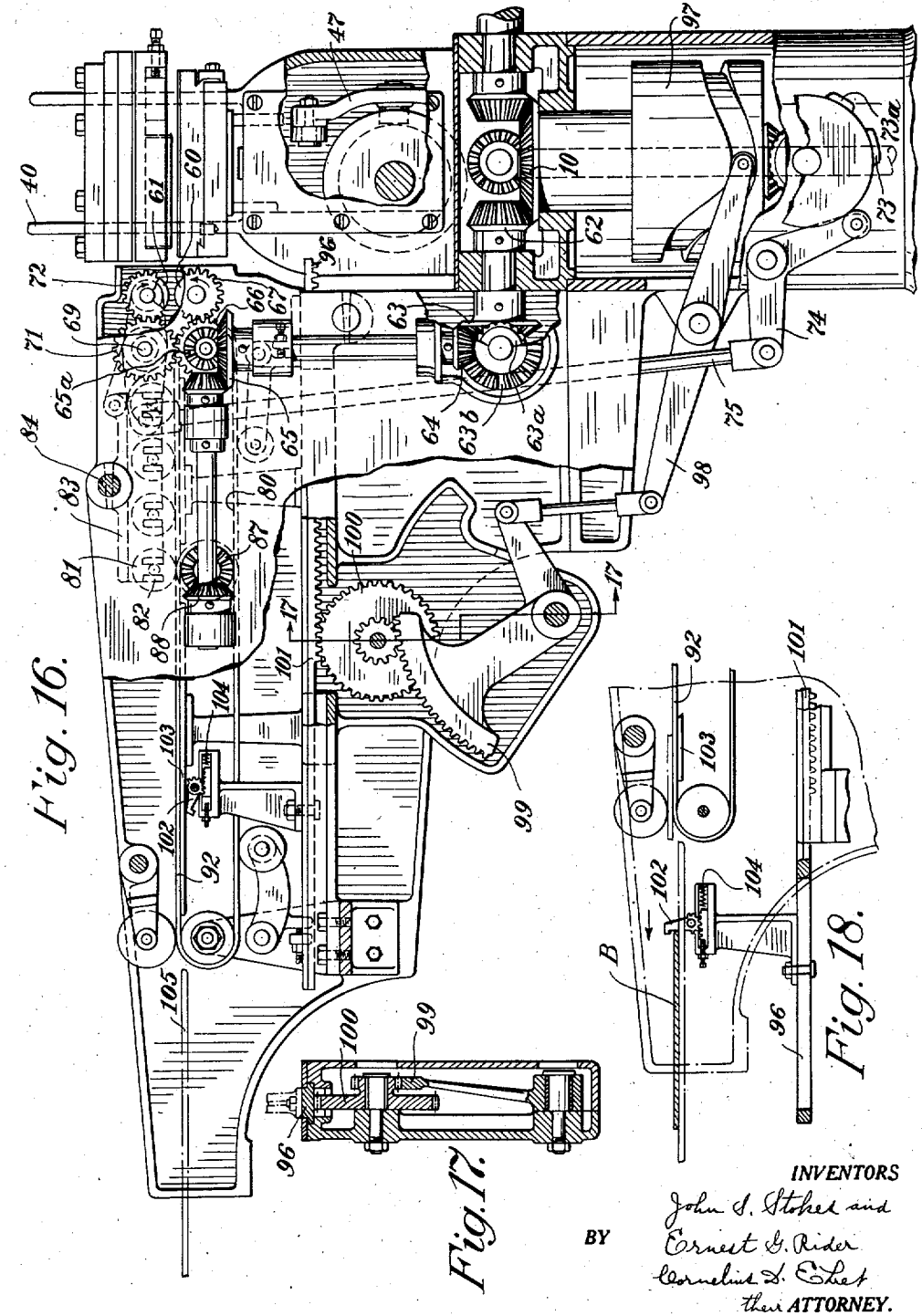

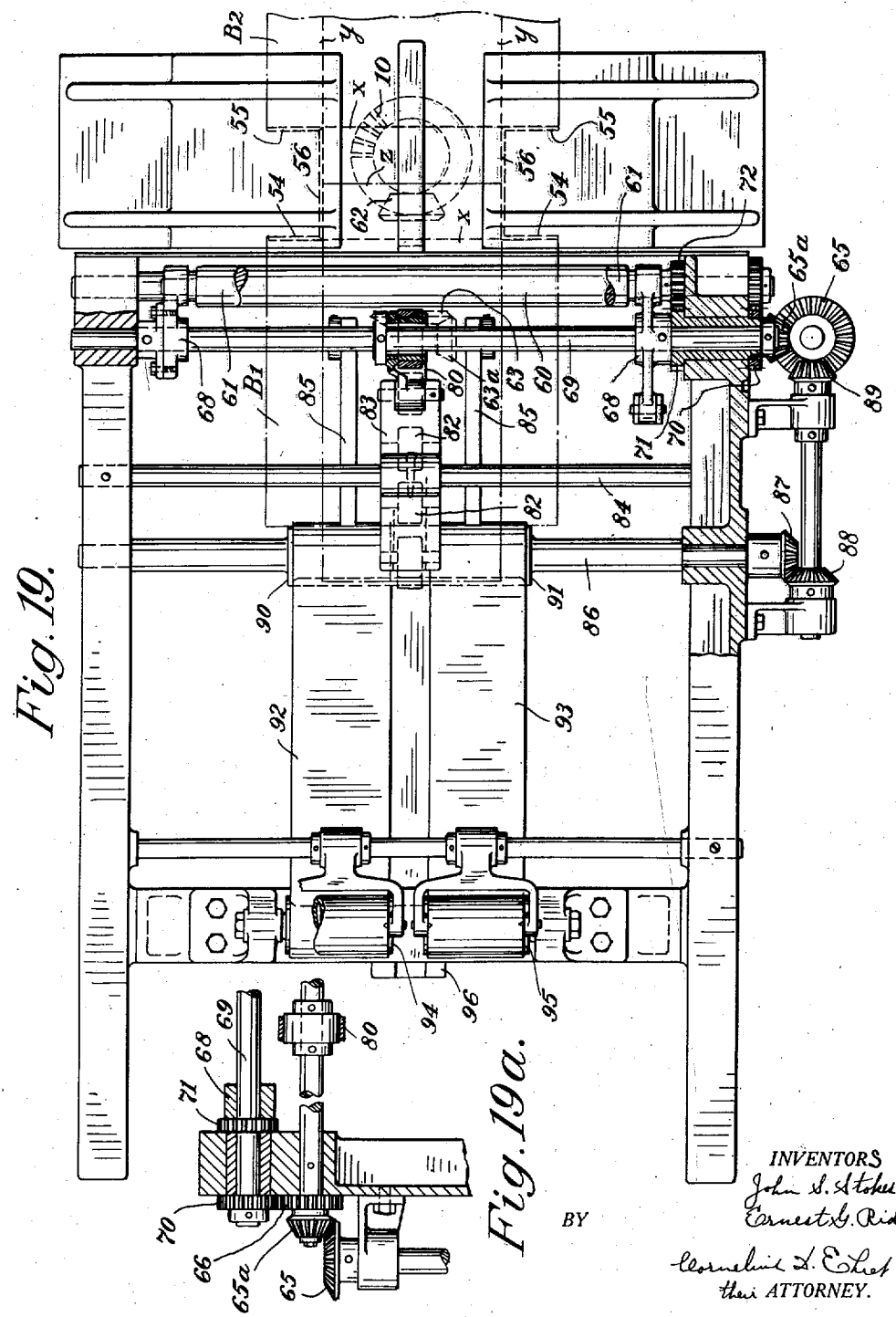

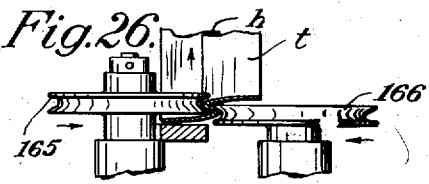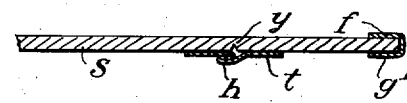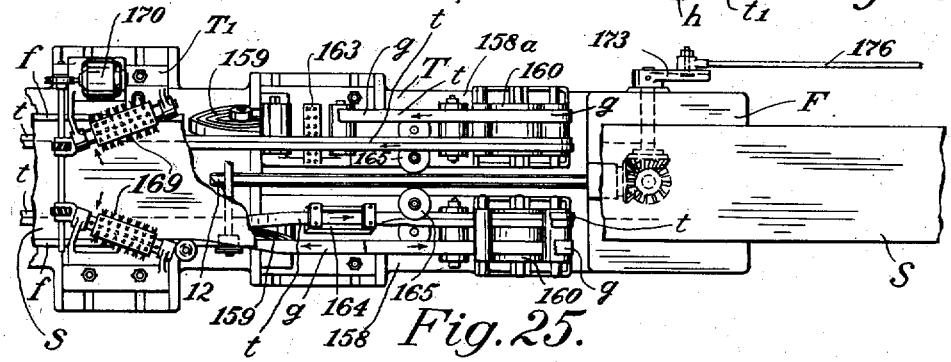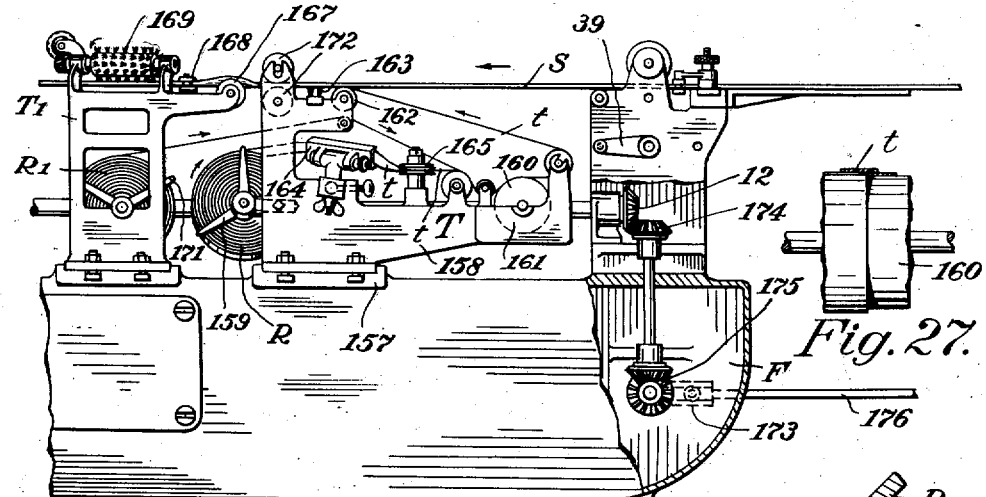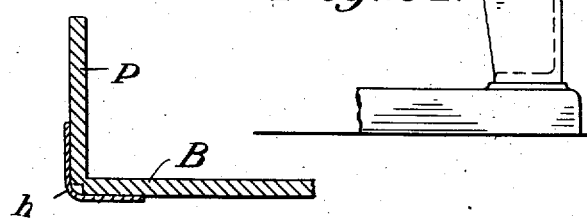

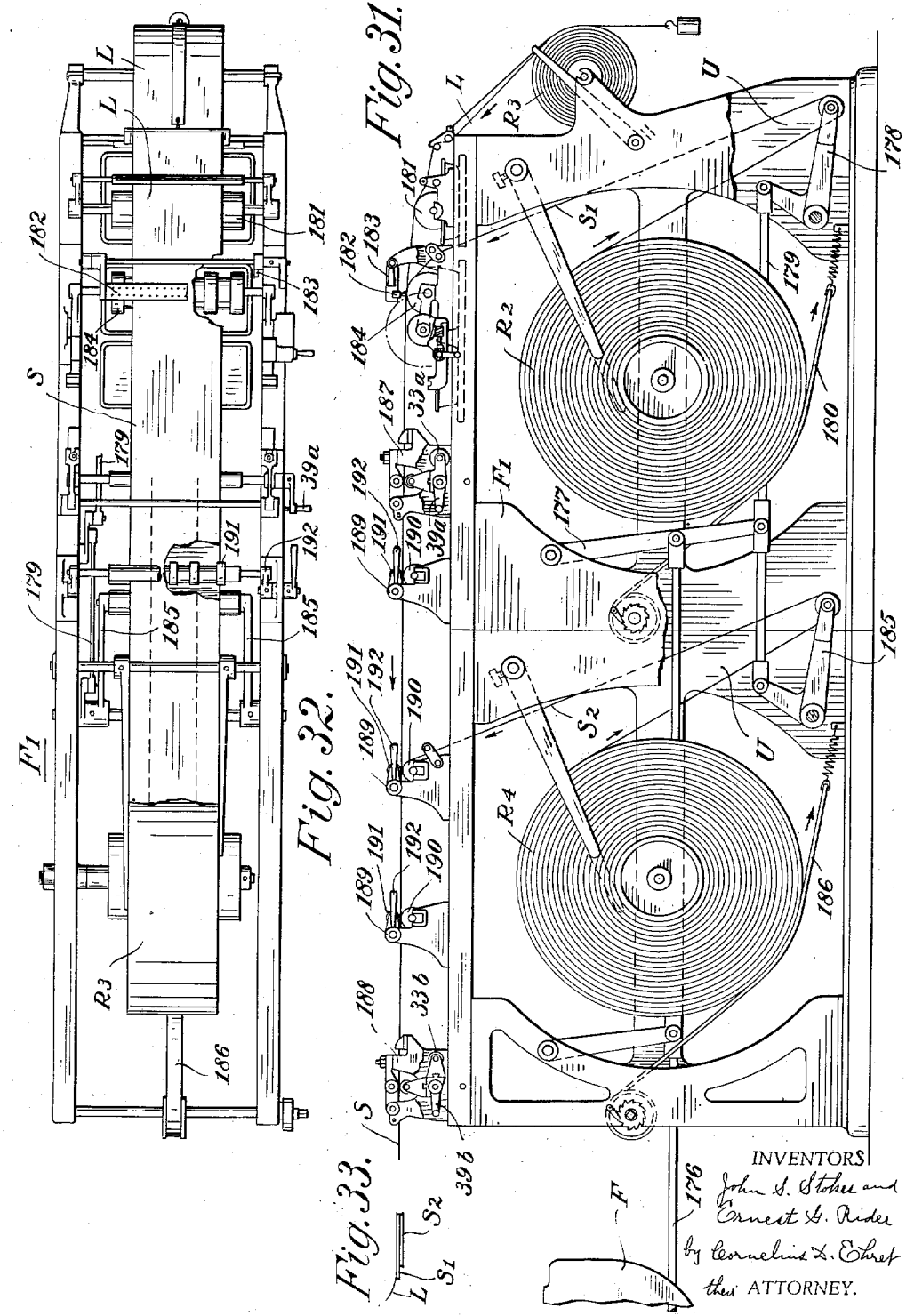

Patented July 21, 1936

2,048,301

UNITED STATES PATENT OFFICE 2,048,301

SYSTEM FOR MAKING BOX BLANKS

John S. Stokes, Huntingdon Valley, and Ernest G. Rider, Philadelphia, Pa., assignors to Stokes and Smith Company, Philadelphia, Pa., a corporation of Pennsylvania Application February 4, 1933, Serial No. 655,194

26 Claims. (Cl. 93—45)

Our invention relates to systems for making box blanks, box cover blanks, components for composite boxes, and the like, hereinafter generically termed box blanks.

In accordance with one aspect of our invention, a strip of box material is scored longitudinally and transversely, and slitted crosswise between adjacent transverse scoring lines to sever the strip between the longitudinal scorings but terminating short of the sides of the strip to permit feeding thereof; and subsequently, the opposite sides of the strip are either notched to complete a one-piece blank and to form the end panel of the blank next succeeding, or cut to complete a box component adapted to form for example the bottom and sides of a composite box.

Also in accordance with our invention, mechanism is provided for forming scored box blanks, or box components from strip box material; more particularly, structure for transversely scoring and/or slitting the strip is mounted upon a carriage which feeds the strip toward notching or cutting mechanism which completes the formation of the blank; preferably, the feeding movement of the carriage also effects longitudinal scoring of the strip.

In accordance with a modification of our invention, the notching, cross-scoring and severance of the strip are substantially concurrently effected to complete one blank and to form one end of the next succeeding blank.

Further in accordance with our invention, after severance of a completed blank from the strip, it is moved away from the cutting mechanism, by a transfer device, which, more specifically, delivers it to a conveyor or other transporting means.

Also in accordance with our invention, there may be disposed between the knives which effect longitudinal scoring, and the notching or cutting mechanism, a device for applying strips of tabbing material to overlie the scoring.

Further in accordance with our invention, there may be provided feeding mechanism in advance of the carriage operating alternately to provide slack or a festoon in the strip; this feature is particularly of importance when the strip is of heavy box material, or when laminated strip is formed prior to or during the feeding operation.

Our invention also resides in the features of construction, combination, and arrangement hereinafter described.

For an understanding of our invention and for illustration of the preferred form of mechanism, reference is to be had to the accompanying drawings in which:

Fig. 1 is a side elevational view of a machine for forming box blanks from strip material.

Fig. 2 is a detail view on enlarged scale, of parts shown in Fig. 1.

Fig. 3 is a top plan view of the box strip illustrating the preparation of blanks.

Fig. 3a shows the completed blank.

Fig. 4 illustrates the strip as operated upon to form the main component of a composite box.

Fig. 4a shows the completed blank or component.

Fig. 5 is a front elevational view, with parts in section, and on enlarged scale, of slitting, scoring, and feeding structure shown in Fig. 1.

Fig. 6 is a side elevational view of parts shown in Fig. 5.

Fig. 7 is a top plan view, with parts in section, of the operating means for the structure shown in Figs. 5 and 6.

Fig. 8 is a detail view taken on lines 8—8 of Fig. 7.

Fig. 9 is a detail view, on enlarged scale, of a scoring device shown in Fig. 1.

Fig. 10 is a front elevational view, parts in section, of strip notching or cutting devices shown in Fig. 1.

Fig. 11 is a side elevational view of the parts shown in Fig. 10.

Fig. 12 is a detailed view in side elevation, of presser block structure shown in Fig. 10.

Fig. 13 is a bottom plan view of a notching or cutting head shown in Fig. 10.

Fig. 14 is a sectional view, in side elevation, of Fig. 13.

Fig. 15 is a detail view of guide structure shown in Fig. 10.

Fig. 16 is a side elevational view, on enlarged scale, and with parts in section, of mechanism shown in Fig. 1.

Fig. 17 is a detail view, in front elevation, taken on section line 17—17 of Fig. 16.

Fig. 18 illustrates parts shown in Fig. 16 in another operating position.

Fig. 19 is a top plan view of the structure shown in Fig. 16.

Fig. 19a is an end elevational view of driving mechanism shown in Figs. 16 and 19.

Fig. 24 illustrates attachments for tabbing and trimming the box body strip.

Fig. 25 is a top plan view, with parts omitted for clarity, of the apparatus shown in Fig. 24.

Fig. 26 is a detail view, on enlarged scale, of tab-folding discs shown in Figs. 24 and 25.

Fig. 27 is a detail view, on enlarged scale of a tab-gluing roll shown in Fig. 25.

Figure 21:
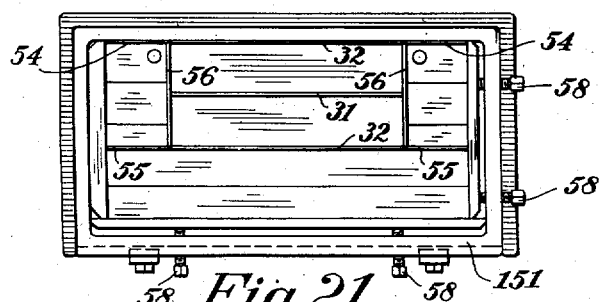
Fig. 21 is a top plan view of the notching and cutting arrangement of Fig. 20.

Figs. 28, 28a, 29, and 30 are sectional views of box body strip with tabbing applied thereto.

Fig. 31 illustrates a preliminary feeding or festooning device for use with the box-body machine of Fig. 1.

Fig. 32 is a top plan view of Fig. 31 with parts broken away.

Fig. 33 is a detail view on enlarged scale of laminated, lined strip produced by the mechanism of Fig. 31.

Referring to Fig. 1, the main drive shaft 1 of the machine is driven as by motor 2 through clutch device 3 provided with control means 4. The drum 5, mounted upon shaft 1 and disposed within the housing 6, is provided with a cam groove 7 for rocking the lever 8 to effect reciprocating movement of the carriage 9.

Gear 10 at the upper end of shaft 1 is in mesh with gear 11 for driving the shaft 12 whose other end is supported by bearing 13 at the receiving end of the machine.

As shown more clearly in Figs. 5 and 6, the shaft 12 passes through the unit 14 mounted upon the carriage 9 for reciprocation therewith. Gear 15 driven from shaft 12 by its engagement with the elongated key 16 is disposed within the unit, and is movable with it as the carriage is reciprocated parallel to the shaft 12. As shown, gear 15 by its engagement with gear 17 drives the drum 18 having a cam groove 19. The lever 20 whose lower end is pivoted to a fixed point on the unit, is provided with a cam follower 21 for engaging the groove 19. The upper end of lever 20 is connected by link 22 to the knee of the toggle formed by the links 23, 24. The upper end of link 23 is connected by pin 25 to the vertically reciprocable slide 26, and the lower end of link 24 receives the pin 27 which extends between the side frames 28, 28 of the unit. Accordingly, as the upper end of lever 20 is moved to the left, the toggle is straightened to move the slide 26 upwardly towards the pressure plate or member 29 which extends across the top of the unit.

Upon the upper face of the slide 26 are mounted suitable devices for operating upon the strip of box material S which is threaded through the unit to pass below pressure plate 29 and above slide 26. With the particular arrangement shown, the slide 26 carries three knives, 30, 31, and 32 which extend transversely of the strip S. The knives 30 and 32 are of such height or so adjusted that when the slide 26 is in its uppermost position, the knives effect cross-cutting of the strip, as shown for example by the lines $x$, $x$, Fig. 3. The middle knife 31 is somewhat higher so that it cuts through the strip to form a slit Z. However, this knife is shorter than the strip S is wide so that the strip is only partially severed, the outer sides of the strip remaining continuous.

The timing is preferably such that the slide 26 is moved upwardly to score and slit the strip S just prior to the beginning of forward or feeding movement of carriage 9, and the slide remains up during this forward movement so that it advances the strip to the left as viewed in Figs. 1 and 3. At the end of this stroke the head 26 moves downwardly, releasing the strip from clamping engagement and the head 26 remains down during the return movement of the carriage to its initial position, completing one cycle of operation of this unit of the machine.

As the strip is pulled forward by the unit 14, longitudinal scoring or creasing $y$, $y$ of the strip S is effected by the disks 33, or equivalent, at the receiving end of the machine. Preferably as shown, the strip S is positioned by the guiding members 34, 34 on opposite sides thereof which lead the strip between the upper pair of knives 33 and the pressure roller 35 which extends between the side frames 36. Preferably the knives 33 are carried by individual supports 37 (Fig. 9) which are adjustable along the supporting member 38 so that the knives may be moved towards or away from each other on opposite sides of the median line of the strip S to vary the distance between the score lines $y$, $y$ for different sizes of boxes. For brevity, scoring is used in a generic sense to comprehend both scoring and creasing.

Preferably the supporting member 38 carries several sets of scoring knives, and is rotatable, as by the handle 39, to bring a desired set of knives into position beneath roll 35. This permits one set of knives to be removed for sharpening without interrupting the operation of the machine except momentarily, or permits different sets of knives to be adjusted for different sizes of boxes so that change-over can be effected by moving handle 39 to proper stop position to select the proper set of knives.

As shown in Fig. 3, the scoring $x$, $x$ and $y$, $y$ divides the strip S into blanks B, B1, B2, etc., to be successively cut from the strip. The slits $z$ effected by the knife 31 of unit 14 extend at least between the longitudinal scoring $y$, $y$, and preferably somewhat beyond. In the strip, each blank comprises the bottom panel $b$, the side panels $s$, $s$, and the end panels $e$, $e$, and the trailing end of each blank is connected to the leading end of the succeeding blank by the continuous portion W which is removed, by mechanism now to be described.

The strip in front of the unit 14 is advanced to pass beyond the cutting or notching device formed by the units 40 and 40a, which are for removing the segments W, W, thereby to complete the severance of the blank B1, and to corner notch the trailing end of blank B1 and the forward end of the next succeeding blank B2. It is understood, of course, that as the strip is advanced each blank in turn passes through the positions indicated by the reference characters B1, B2, etc. The apparatus is preferably arranged so that, as shown in Fig. 1 and superposed Fig. 3, when the unit 14 is at the end of its feeding stroke, there is one blank between it and the notching or cutting devices 40, 40a, and the length of stroke is equal to the distance between adjacent slits $z$, $z$, i. e., twice the height of the box plus a dimension of the box bottom $b$, parallel to the direction of strip feed. In other words, for each forward movement of the unit 14 the strip S is advanced to an extent corresponding to one blank, and for each operation of the cutting device 40 which occurs when the unit 14 is stationary at the end of its feeding stroke, a pair of opposite segments W are removed to complete one blank and to finish the forward end of the next blank; the finished blank is shown in Fig. 3a.

The mechanism for effecting removal of segments W is most clearly shown in Figs. 10 to 15. As the unit 40a is a duplicate of unit 40, only the latter is specifically described; it being understood that the operation of the units is simultaneous. The gear 10 at the top of shaft 1 drives, through gear 41, the shaft 42 which slidably engages the hub of gear 43 contained within unit 40 for driving, through gear 44, the drum 45 having a cam groove 46. The lever 47 pivoted at its lower end to the unit carries the cam follower 48 and the upper end of lever 47 is connected by link 49 to the end of a toggle formed by the links 50 and 51 to effect actuation of the slide 52. In general, the mechanism for operating the slides 52 and 52a is similar to that for effecting reciprocation of slides 26 of unit 14. In moving upwardly, the slides 52 and 52a press the opposite edges of the strip S against stationary knife structure carried by the brackets 53, 53a.

For effecting removal of segments W, W, such as shown in Fig. 3, the knives are arranged as shown in Fig. 13. The three knives 54, 55, and 56 are held in position in the hollow frame 57 by screws 58, which clamp the knives between the filler blocks 59. To assist or effect removal of the segments W from the frame, the blocks 59 may comprise or may be backed by suitable resilient material as sponge rubber.

It is to be understood, of course, that for different sizes and shapes of blanks, the arrangement of the knives and filler block will be different to accommodate the particular circumstances.

The knives 56 are parallel to each other and cut the strip along the scoring $y$, $y$, while the knives 54 and 55 of each frame cut along the transverse scoring $x$, $x$. As the slit $z$ is at least as long as the distance between the longitudinal scoring, as soon as the notching, or removal of segments W, W is effected the severance of the first blank B1 from the strip is completed.

The mechanism described performs a method of forming box-blanks generally similar to that described and claimed in my application Serial No. 586,530, filed January 14, 1932, but which is specifically different in that the strip is first slitted and the notching of the blanks utilized to complete the severance of the strip.

Substantially immediately after the slides 52 move downwardly the unit 14 by its reciprocating movement feeds another blank to the cutting and notching edge. Preferably the timing of the mechanism is such that the notching occurs when the unit 14 is in the position shown in Fig. 1 at the end of its forward travel, and the strip is held or clamped by the units 40, 40a during return movement of the unit 14 to its initial slitting and notching position.

The forward or feeding movement of the unit, as stated above, advances the strip so that the blank to be cut by the next operation of the notching device actually extends substantially beyond the units 40, 40a, only the trailing end of the blank remaining under the knives. This projecting part of the strip, extends between the transfer rolls 60, 61, Fig. 16, which are constantly revolving, though out of engagement with the blank. After severance of the blank by completion of the notching operation, these rolls are brought into engagement with the blank by mechanism now to be described, to propel it to the left, Fig. 16, away from the cutting or notching device 40, 40a.

The lower transfer roll 60 which rotates about a fixed axis is driven from the gear 10 at the top of shaft 1 by the train of gears 62, 63, 63a, 63b, 64, 65, 65a, 66, and 67. The upper transfer roll 61, as shown most clearly in Figs. 19, 19a is journaled in the ends of the arms 68, 68 carried by the rock shaft 69 upon which is mounted for movement independently thereof, the rotating sleeve and gear unit 70 which is driven by gear 66 and which drives the roller 61 through the gears 71, 72. Since the axis of shaft 69 is concentric with the axis of rotation of the unit 70, the roller 61 is continuously driven independently of its position. Normally, as above stated, the roll 61 is substantially separated from the roll 60. When, however, the notching knives cut a blank from the strip, the cam 73, Fig. 16, rocks the bell crank lever 74 to raise the link 75 which effects clockwise rotation of the rock shaft 69 to bring the roll 61 into momentary engagement with the upper face of the blank and to force it against the lower feed or transfer roll 60. The rolls 60, 61 which are rotating at high speed propel the blank to the left, Fig. 16. They are then again momentarily brought together by cam 73a to eject the segments W which in the meantime have been pushed to the left by feeding of strip S.

As shown by Fig. 2, the link member 75 is preferably divided and its sections joined by a resilient coupling; for example the upper section 75a and lower section 75b are joined by the lost motion connection afforded by the sleeve 76 secured to one of them and a pin 77 secured to the other and slidable in the slot 78 of the sleeve. The thrust of the lower member 75b is transmitted through the spring 79 disposed within the sleeve.

The ejected blank is delivered to the narrow conveyor belt 80. It is pressed down on the belt by the rollers 81 whose shafts are free to move up and down between the guides 82. The frame 83, carrying the guides is secured to the shaft 84 extending between the side frames of the machine. The sides of the blank on either side of the narrow conveyor belt 80 are supported by the strips or plates 85. The conveyor belt 80 at its delivery end passes over and is driven by a pulley mounted upon the shaft 86 which is driven through the gearing 87, 88, 89, from gear 65. Upon the same shaft are also mounted the pulleys 90, 91 which drive the spaced conveyor belts 92, 93, whose forward ends pass over the pulleys 94, 95 at the delivery end of the machine. The chips or segments W do not reach belts 92, 93 as they are not supported by belt 80 or plates 85 in the gap between the notching head and belts 92, 93.

To effect movement of the blank to a predetermined position, a feature which is of importance when the machine is used for delivering the blanks in succession and as formed, to other automatic apparatus, such as for example the box bending mechanism shown and described in co-pending application Serial No. 658,934, filed February 28, 1933, there is provided a reciprocating slide 96 which is driven from the cam 97 secured to shaft 1 through the system including the oscillating lever 98, gear segment 99, and gear 100, the latter engaging the rack 101 of the slide. The receiving end of the bending mechanism is shown in Fig. 1; its frame member F1 is held to the delivery end of the box body machine, with its transfer arm 149 adapted to move toward and from plate 105.

When the rack moves to the right from the position shown in Fig. 18, the finger 102 is engaged by the plate 103 and forced to rotate in a counter-clockwise direction against the tension of spring 104. Upon movement to the left, the finger 102 swings to its upper position as it passes beyond plate 103 to extend above and engage the rear edge of a blank B which in the meantime has been delivered by the conveyor belts 92, 93 to the split plate structure 105, to move the blank upon further movement of the slide 96 to a definite predetermined position.

The machine described is adapted to make box blanks varying widely as to any one or more of their essential dimensions, simply by adjustment of one or more of the various instrumentalities above described. The scoring knives 33 for longitudinal scoring are, as above stated, adjustable to vary the distance between the longitudinal scoring. The distance between the transverse scores $x, x$, is effected by changing the arrangement of the filler blocks which hold the knives 30 and 32 in position upon the head or slide 26. The adjustment of the heads 40, 40a is effected simply by loosening the clamping nuts 106 of the associated unit and revolving the handle 107 which is secured to the member 108 threadably engaging the nut 109 depending from the slide 40 (or 40a). For boxes of different depth, the arrangement of knives 54, 55, and 56 is suitably changed, i. e., for deeper boxes the knife 56 is of suitably greater length and the spacing between knives 54 and 55 is correspondingly increased.

As indicated, the frames 57 for holding the notching knives are readily disengageable from the brackets 53, 53a for this purpose. It is only necessary to loosen the clamping screws 110 which pass through the bracket 53 into the threaded holes 111 of the guide structure 112, shown in Fig. 15. When the nuts are tightened the two sections 113, 113 flex slightly because of the reduced section joining them to the remainder of the guide. To remove the frame 57, it is only necessary to loosen bolts 110 and slide the frame out of its guides.

The uppermost position of the slides 52 and 52a is variable to accommodate blanks of different thickness, by change of the position of the lower pivot 114 of toggle link 51. Specifically, the pivot 114 is eccentric to the shaft 115 which supports it or with which it is integral. The ends of the shaft 115 are journaled in the side frames of the unit, and preferably one of them is suitably shaped or formed for application of a tool for rotating it; for example, as shown in Fig. 12 effectively to change the lower pivot point of link 51. The nut 116 clamps the pin or shaft 115 in its adjusted position.

A generally similar arrangement is utilized for changing the upper limit position of the slide 26 of the unit 14, as shown most clearly in Fig. 5.

The arrangement for changing the length of stroke of the carriage 9 for forming blanks of different length, is most clearly shown in Figs. 1, 7 and 8. The lever 8, as above described, is oscillated by the cam 5. One end of the lever 8 is connected by the link member 117 to one end of the member 118 pivoted at 119 which is provided with a gear segment 120 for driving the crank arm 121 through the gearing 122, 123, 124. The crank pin 125 is secured to the link 126 whose other end is pivoted to the carriage 9 at 127. Arm 121 is swung from the dead-center position of Fig. 1 through 180° to its other dead-center position; accordingly errors in position of slide 14 at its limits of travel due to lost motion are avoided. To vary the length of the stroke, the pin 125 is shifted radially toward or away from the axis of rotation of its driving gear 124. The nut 128 is loosened to release the pin from the clamping afforded by the members 129 and 130, and then the hand wheel 131 is rotated, it being understood that the shaft 132 threadably engages the block 133 to which the pin 125 is secured or with which it is integral. The position of the carriage at the end of its stroke is predetermined by changing the position of the crank pin in the slot 134 of the connecting link or rod 126. With the nut 139 loosened, the gear 135 is rotated to revolve gear 136 whose hub is internally threaded to receive the screw 137 which has one end secured to the member 138 which remains in fixed position with respect to the pin 125 and may for example, be a member encircling it. This rotation of gear 135 effects movement of the link 126 to the right or left and so directly changes the position of the unit. When the desired position has been attained, the nut 139 is tightened to clamp the member 138 against the link 126.

For access to the knives 30, 31, and 32 for adjustment or replacement, the pressure plate 29 is adapted to be swung back; as shown in Figs. 5 and 6 the nuts or threaded members 140, 140, may be unscrewed, at least sufficiently to permit the clamping links 141 to be swung outwardly out of engagement with the plate, whereupon rotation of the handle 142 causes the plate or member 29 to swing about its pivot 29a. The worm and gear drive 143, 144 ensures that the plate will remain in the position to which it is adjusted by the handle, the worm and gear forming a one-way driving connection.

The unit 14 may be adjusted with respect to carriage 9 by loosening the nut 145 by rotating the handle 146 which drives the screw 147 threadably engaging the nut 148 attached to the unit 14.

The same mechanism may also be used to make blanks which are adapted to form only the bottom and sides, or bottom and ends, of a box, i. e., a blank such as shown in Fig. 4a, it being understood that the components of the box will be added and held in box forming position, generally as described and claimed in Stokes Patent No. 1,796,630. The only adjustments or changes necessary to produce this type of blank are to swing the handle 39 so that no longitudinal scoring is effected and to replace knives 54, 55 and 56 by a single knife in each head 40, 40a to complete the severance of the strip; i. e., the slitting effected by these two knives is in effect the continuation of slit $z$, all as clearly shown in Fig. 4 and as may be readily understood from the above description of the apparatus.

Figure 20:
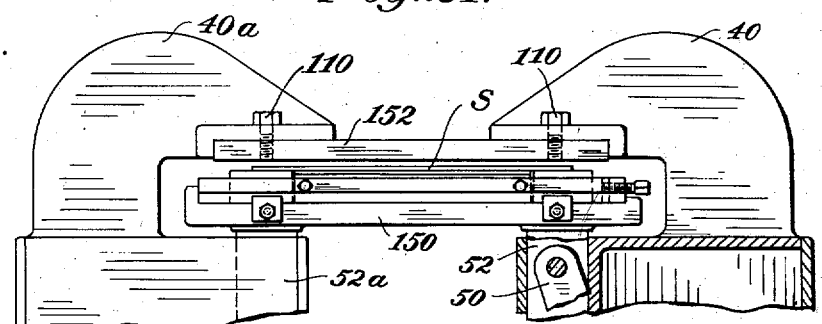
Fig. 20 illustrates a modification of the mechanism shown in Fig. 10.

By a slight modification of the heads 14, 40, and 40a, the cross-scoring and notching can all be effected by heads 40 and 40a, slide 14 then being utilized only for feeding of the strip. Referring to Fig. 20, the slides 52 and 52a of the heads 40, 40a, are joined by the projecting plate 150 upon which is mounted the clamping frame 151 for both sets of notching knives 54, 55, and 56, slitting knife 31, and scoring or creasing knives 32, 32. As the plate 150 is raised by the plungers 52, 52a, it presses the box strip S against the back plate 152 which extends between and is connected to the heads 40, 40a.

Figure 23:
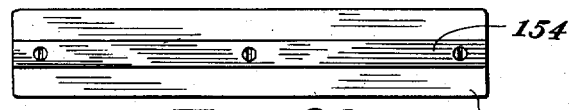
Fig. 23 is a top plan view of the gripper plate of Fig. 22.
Figure 22:
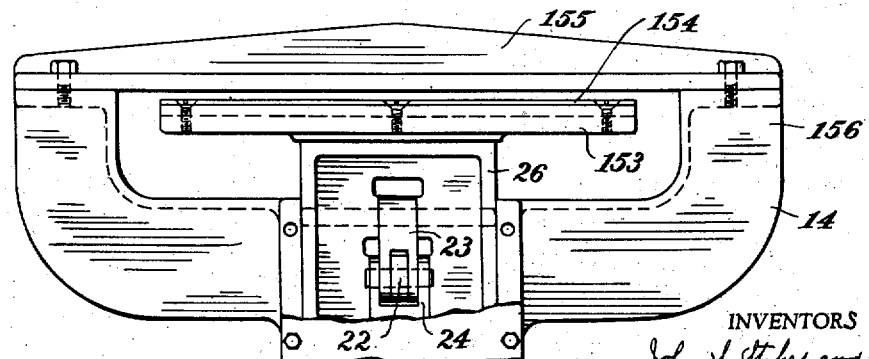
Fig. 22 illustrates a modification of feed carriage of Fig. 5.

With this modification of the notching heads, the construction of the feed slide 14 may be simplified, as shown in Figs. 22 and 23. Upon the plunger 26 is mounted the plate 153 to which is secured the clamping bar 154, preferably of rubber, which when the plunger is raised clamps the box strip S against the back plate 155 extending between the ends of the U-shaped frame member 156 of the slide 14.

For making the main component of three-piece boxes with the modified construction, the handle 39 may be rotated to swing the scoring knives 33 away from engagement with the strip S, and in the heads 40, 40a, Figs. 20, 21, the notching knives 54, 55, and 56 are omitted. The knife 31 (Fig. 21) for severing the strip, and knives 32 for scoring or creasing it, will ordinarily under these circumstances be at least as wide as the strip.

The blanks may be tabbed concurrently with their formation from the strip by the tabbing attachments generally indicated by T, Figs. 24 and 25. This unit or attachment consists of a plate 157, secured to or mounted upon the frame F of the machine shown in Fig. 1 between the feed unit 14 and the receiving or right-hand end of the machine. Upon the support 157 are adjustably secured the two tabbing heads 158, 158a which are essential duplicates. Each supports a reel 159 for carrying a roll R of tab strip t which is fed into engagement with the surface of the adhesive applying roll 160 which dips into adhesive contained in the reservoir 161 of the head. The strip, after leaving roll 160 passes over the idler roll 162 and its coated face is brought into engagement with the lower surface of the box strip S.

The composite strip formed by the strip S and the applied strips t pass above the brushes 163 which effect more intimate engagement between the tab strips and the strip of box material.

It is to be understood that the unit or slide 14 in its strip advancing movement above described, draws the tab strips t, t from the rolls R through the tabbing heads into adhesive engagement with the box strip to overlie the scoring or creasing effected by knives 33, 33. When the distance between scoring knives 33 is changed for different widths of box bottom, the tabbing device is correspondingly adjusted by moving units 158, 158a toward or away from each other on opposite sides of the median line.

As it is usually necessary to bend the side walls of a box blank almost flat against the box bottom to insure that the sides of the finished box shall not be bowed or distorted, there is a strong tendency for the tabs to loosen or pull away if they have been applied to the box blank in the flat. To overcome this tendency, the tab strip t is provided with a slack or unapplied portion h, which when the box side panel p is bent, as shown in Fig. 29, allows the bending to take place without tendency for the applied portions of the tab to pull away from the box material. Consequently, when the box panel is restored to its normal or vertical position, Fig. 30, the applied portions of the tab are still in their original position. The slack portion of the tab is produced as the tab strip is withdrawn from the roll R and fed towards the region of its application to the box strip S. Specifically each of the tab strips t is fed through the angularly adjustable guide 164 and passes between the two rollers 165, 166, shown in detail in Fig. 26, which are staggered so that the flange of roller 166 lies between the flanges of roller 165, so that the strip fed between the rollers is provided with a double tuck or loop fold h. The heads 158, 158a are so adjusted that the slack or folded portion of the tab lies opposite the scoring or creasing of the strip S. The tabbing attachment T can be used for other purposes, for example it may be employed to form box blanks whose sides may be of greater thickness than the box bottoms by providing rolls R of box body material rather than tab strip material. The method of forming a box blank of this character is described and claimed in co-pending application Serial No. 485,631, filed October 1, 1930.

Furthermore, the tabbing units may be used to cover the side panels of the blank, and/or to trim its edges. The strip removed from the rolls R may be of sufficient width, as shown in Fig. 28a, to cover the side panel P of the box to form the tab, and/or to trim or cover the edge e of each side of the strip. In this case the outer edges of the strip t1 as applied will project beyond the sides of the box strip. These projecting edges are turned first vertically by the rolls 167 and then folded down against the upper surface of the box strip S by the flanged wheels 168. The brushes 169 driven by motor 170 effect more intimate engagement between the turned over edge f of strip t1 and the upper surface of the box strip.

When the trimming strip g is separate from the tab strip t, i. e., when it is not desired to cover the side panel of the box blanks cut from the box strip, the trimming strip is removed from the roll R1 supported by reels 171 of the edge trimming attachment T1. As shown most clearly in Figs. 24 and 25 the strip g removed from roll R1 is threaded through the tabbing heads so as to receive a coating of adhesive from the glue rolls 160. Thereafter the strips pass over idler rolls of the tabbing heads and are pressed against the box strip at its edges by rolls 172. As described before, the projecting portions of the trimming strip g are turned upwardly and over the edge of the box strip and thence downwardly into engagement with its top surface. The edge trimming attachment T1 also comprises heads which are adjustable towards and from each other on opposite sides of the median line of the machine to accommodate various sizes of box strip.

In the making of three-piece boxes, tab strip may be applied to the edges of strip S, generally as shown in Fig. 4, by the tabbing attachments T, Fig. 24, to perform the method described and claimed in application Serial No. 480,432, filed September 8, 1930.

Alternately, the longitudinal scoring may be retained and the cross scoring omitted by removal of knives 30, 32 and replacement of knives 54, 55, and 56 by a single knife for extending slit z to the edges of strip S to form blanks used in the method claimed in Patent No. 1,880,288.

Particularly when the box material is heavy, it is desirable to provide a preliminary feed for the strip instead of requiring the slide 14 to move the strip directly from a roll. The mechanism shown in Figs. 31 and 32 is for producing a festoon in the strip between each feeding movement of slide 14 so that slide 14 need only take up the slack in the strip.

Referring to Fig. 24, to the crank arm 173 which is continuously rotated in timed relation to shaft 12, through the gearing 174, 175, is connected the rod 176 which, as shown in Fig. 33, is connected to the pivoted arm 177 of the preliminary feeding mechanism. As arm 177 swings counter-clockwise the bell-crank lever 178 connected thereto by rod 179 swings in clockwise direction to lengthen the loop U of the box strip S removed from roll R2.

As the arm 177 moves in clockwise direction, the arm 178 swings upwardly to leave the loop U loose or slack, so that slide 14 of the box body machine in its next forward or feeding movement, has only to shorten the loop U and need not effect of itself any rotation of the roll R2. The brake 180 prevents the roll from rotating after arm 178 has moved to its maximum position, i. e., it overcomes the tendency of the roll to continue in motion after the arm 178 has lengthened the loop U to the desired extent.

If desired, the box blanks may be lined while still in the form of box strip. The strip of lining material L removed from roll R3 is coated with adhesive as it passes over the applying roll 181 and is wiped into engagement with the upper surface of the box strip S by the brushes 182 at the end of pivoted arm 183.

The use of the festooning or preliminary feeding device is also desirable when the strip S is made of several strips of box material brought into adhesive engagement to form laminated strip S, because otherwise a much heavier load would be imposed upon the feeding slide 14, and also since the use of the festooning device as hereinafter described precludes slippage or relative movement between the laminations of the strip.

From the second roll R4 of box body material is removed strip S2 which is brought into engagement with the lower surface of the strip S1 which for laminated box work has been coated with adhesive during passage of the strip over glue applying roll 184 which preferably is grooved to apply the adhesive in stripes. The arm 185 is connected through rod 179 to the swinging arm 177 to produce slack in strip S2. Brake member 186 prevents the roll R3 from overtravelling.

Since in laminated box blanks, it is desirable that the scoring of the inner lamination shall be somewhat closer together than the scoring of the outer lamination or laminations, and since with the box machine of Fig. 1 individual scoring of the laminations could not be effected, the preliminary feeding machine or festooner F1 is provided with the scoring heads 187, 188. Detail description of these units is not necessary as they are generally similar in construction to the longitudinal scoring head of the machine of Fig. 1. The scoring or creasing knives of the several units are individually adjustable toward and away from the center line of the machine. The several heads 189 having fixed lower rolls 190 and upper pressure rolls 191 each at the end of a pivoted arm 192 are for the purpose of holding the strip S substantially straight, during feeding movement of slide 14 and during the festooning movement of the arms 178, 185. Preferably, the roller 190 at the first head 189 is provided with grooves displaced with respect to the grooves of roller 184 to straddle the stripes of adhesive.

Covered box blanks may be produced by replacing roll R4 of box body material by a roll of suitable box covering material. The scoring or creasing knives 33b are swung to inoperative position.

While we have illustrated and described our preferred types of blank-forming mechanisms, it is to be understood that our invention is not limited thereto but is co-extensive in scope with our appended claims.

What we claim is:

1. Reciprocating structure for intermittently holding and advancing a strip of box material, means for scoring the strip longitudinally during its movement by said structure, means for notching, transversely scoring and severing said strip, and mechanism for operating said means in timed relation to said structure to effect notching, transverse scoring and severing of the strip while it is at rest.

2. Reciprocating structure for intermittently holding and advancing a strip of box material, means for simultaneously notching, scoring and severing said strip to complete one blank and to form the leading end of the next succeeding blank, and mechanism for operating said means in timed relation to said structure to effect notching, scoring and severing of the strip while it is at rest.

3. Reciprocating structure for intermittently advancing a strip of box material, means carried thereby for transversely scoring said strip, and means for actuating said scoring means while said structure is at rest.

4. Reciprocating structure for intermittently advancing a strip of box material, and scoring means carried thereby for scoring the strip while said structure is at rest and holding it during forward movement of said structure.

5. Mechanism for feeding and scoring a strip of box material comprising reciprocating structure, scoring means carried thereby, and means for actuating said scoring means to clamp and score said strip prior to forward movement of said structure and for releasing the strip prior to return movement of said structure.

6. Mechanism for making box blanks comprising a reciprocating slide for intermittently engaging and feeding a strip of box material of width corresponding in width to the length or width of the box blanks step by step, means for transversely scoring the strip while at rest, and means for varying the stroke of said slide to vary the extent of feed of the strip per step.

7. Mechanism for feeding and scoring a strip of box material comprising reciprocating structure, scoring means carried thereby, means for actuating said scoring means to clamp and score said strip prior to forward movement of said structure and for releasing the strip prior to return movement of said structure, and means for varying the extent of movement of said structure to vary the extent of feed of the strip.

8. Means for scoring a strip of box material, mechanism for severing the scored strip, and reciprocating structure for engaging and advancing the strip from said scoring means to said cutting mechanism intermittently for successive foward movements of said structure.

9. Means for longitudinally scoring a strip of box material, mechanism for notching the opposite sides of the strip, and reciprocating means for feeding the strip from said scoring means to said notching mechanism and including means for transversely slitting the central portion of the strip.

10. Means for longitudinally scoring a strip of box material, mechanism for notching the opposite sides of the strip, and reciprocating means for feeding the strip from said scoring means to said notching mechanism and including means for transversely scoring the strip.

11. Means for longitudinally scoring a strip of box material, mechanism for notching the opposite sides of the strip, and reciprocating means for feeding the strip from said scoring means to said notching mechanism and including means for effecting parallel scores extending transversely of the strip and for slitting the strip transversely between said transverse scores to separate it between the longitudinal scoring.

12. Means for feeding a strip of box material, as rotatable mounting for a plurality of scoring structures spaced angularly about the axis of said mounting, and means for rotating said mounting to different angular positions selectively to bring desired scoring structure into position for scoring the strip during feeding thereof.

13. Mechanism for forming box blanks from a strip of box material comprising means for intermittently feeding the strip, means for longitudinally scoring the strip during said feeding thereof, means operative while the strip is at rest to cut blanks therefrom in succession, and means for delivering the blanks individually and in succession from said cutting means to a predetermined position comprising reciprocating means having gripper structure for clamping an edge of a blank, and means for releasing said gripper structure upon delivery of the blank to said predetermined position.

14. Mechanism for forming box blanks from a strip of box material comprising means for intermittently feeding the strip, means operative while the strip is at rest to notch and sever the strip to complete one blank and to form the leading end of the next succeeding blank, and means for delivering the completed blanks individually and in succession from said cutting means to a predetermined position comprising an endless conveyor, and reciprocating means having gripper structure for engaging a blank on said conveyor, and means for releasing said gripper structure upon delivery of the blank to said predetermined position.

15. Mechanism for cutting box blanks in succession from a strip of box material, transfer rolls disposed on opposite sides of strip projecting beyond said mechanism, and means operative after the projecting strip has been cut by said mechanism to form a box blank to effect feeding engagement thereof with said rolls for transfer from said mechanism.

16. Mechanism for forming box blanks from a strip of box material, a strip cutting device, transfer rolls disposed beyond said device, means operating intermittently to advance the strip to move the leading end thereof beyond said device and between said rolls while separated, means for operating said cutting mechanism while the strip is at rest to cut off the forward portion to form a blank, and means for thereafter effecting relative movement of the transfer rolls toward each other to engage said blank for transferring it from said mechanism.

17. Mechanism for forming box blanks comprising means for supporting a roll of strip box material, means for cutting the strip into box blanks, feeding means for intermittently advancing the strip to said cutting means, intermittently operating means for festooning the strip between said roll and said strip advancing means, and means for adjusting the extent of movement of said feeding means independently of said festooning means.

18. Mechanism for forming laminated box blanks comprising means for supporting rolls of strip box material, means for effecting adhesive engagement between strips removed from said rolls to form laminated strip, means for cutting the laminated strip into box blanks, means for intermittently feeding the laminated strip to said cutting means, mechanism operating in alternation with said feeding means to festoon the laminated strip prior to feeding by said feeding means, and means for adjusting the extent of movement of said feeding means independently of said festooning means.

19. Means for feeding and scoring a strip of box body material, means for feeding tab strip into adhesive engagement with said strip of box material to overlie the scoring, means for producing a fold in the tab strip prior to its application to said strip of box material to permit subsequent bending at the scoring with elimination of tendency for the tab strip to separate from the box body material or to split, and means for applying adhesive to the folded strip.

20. Box body apparatus comprising means for feeding a strip of box-body material from a roll into adhesive engagement with a strip of box lining material and means for producing slack in said strip of box material between said roll and the region of joinder of said strip with said strip of lining material.

21. Box body apparatus comprising means for feeding strips of box-body material from rolls into adhesive engagement, and means for producing slack in said strips of box body material between each of said rolls and the region of joinder of said strips.

22. Mechanism for making box blanks comprising a reciprocating carriage, strip-clamping means carried thereby, strip-severing and clamping mechanism adjacent a limit of travel of said carriage, means for operating said carriage, said strip-clamping means and said strip-severing and clamping mechanism to effect clamping of the strip by said clamping means before and during forward movement of said carriage and clamping of the strip by said clamping mechanism before and during return movement of the carriage, and means for adjusting the limits of movement of said carriage.

23. Mechanism for making box blanks comprising a reciprocating carriage, strip-clamping means carried thereby, strip-severing and clamping mechanism adjacent a limit of travel of said carriage, means for operating said carriage, strip-clamping means and strip-severing and clamping mechanism to effect clamping of the strip by said clamping means before and during forward movement of said carriage and clamping of the strip by said clamping mechanism before and during return movement of the carriage, and means for independently adjusting the extent and limits of movement of said carriage.

24. Mechanism for making box blanks comprising strip-severing units on opposite sides of the path of feed of a strip of box material, reciprocating structure for feeding said strip, means for adjusting said units toward and away from each other, and means for varying the initial and final positions of said feeding structure.

25. Mechanism for making box blanks comprising strip-severing units on opposite sides of the path of feed of a strip of box material, reciprocating structure for feeding said strip, means for adjusting said units toward and away from each other, means for varying the initial and final positions of said feeding structure, scoring units adjacent opposite edges of the strip, and means permitting adjustment of said units toward and away from each other.

26. Means for feeding and scoring a strip of box body material, means for feeding a strip of sheet material into adhesive engagement with said strip of box material to overlie the scoring, means for producing a fold in the strip of sheet material prior to its application to said strip of box material to permit subsequent bending at the scoring with elimination of the tendency for the sheet material to separate from the box body material or to split, and means for rendering adhesive the portion of the box-body material engaging surface of the strip of sheet material which is not included in the fold.

JOHN S. STOKES.
ERNEST G. RIDER.

CERTIFICATE OF CORRECTION.

Patent No. 2,048,301.                                    July 21, 1936.

JOHN S. STOKES, ET AL.

It is hereby certified that error appears in the printed specification of the above numbered patent requiring correction as follows: Page 7, first column, line 6, claim 12, for "as" read a; and that the said Letters Patent should be read with this correction therein that the same may conform to the record of the case in the Patent Office.

Signed and sealed this 22nd day of December, A. D. 1936.

(Seal)

Henry Van Arsdale
Acting Commissioner of Patents.

box body material, means for feeding a strip of sheet material into adhesive engagement with said strip of box material to overlie the scoring, means for producing a fold in the strip of sheet material prior to its application to said strip of box material to permit subsequent bending at the scoring with elimination of the tendency for the sheet material to separate from the box body material or to split, and means for rendering adhesive the portion of the box-body material engaging surface of the strip of sheet material which is not included in the fold.

JOHN S. STOKES.
ERNEST G. RIDER.

CERTIFICATE OF CORRECTION.

Patent No. 2,048,301.                                July 21, 1936.

JOHN S. STOKES, ET AL.

It is hereby certified that error appears in the printed specification of the above numbered patent requiring correction as follows: Page 7, first column, line 6, claim 12, for "as" read a; and that the said Letters Patent should be read with this correction therein that the same may conform to the record of the case in the Patent Office.

Signed and sealed this 22nd day of December, A. D. 1936.

(Seal)

Henry Van Arsdale
Acting Commissioner of Patents.

CERTIFICATE OF CORRECTION.

Patent No. 2,048,301. July 21, 1936.

JOHN S. STOKES, ET AL.

It is hereby certified that error appears in the printed specification of the above numbered patent requiring correction as follows: Page 7, first column, line 6, claim 12, for "as" read a; and that the said Letters Patent should be read with this correction therein that the same may conform to th record of the case in the Patent Office.

Signed and sealed this 22nd day of December, A. D. 1936.

(Seal)

Henry Van Arsdale
Acting Commissioner of Patents.